US012230894B2

(12) United States Patent
Samardzija et al.

(10) Patent No.: US 12,230,894 B2
(45) Date of Patent: Feb. 18, 2025

(54) INTEGRATED SHEET-METAL ANTENNA WITH CARRIER SCREW WHICH OPERATES AS A GROUND FEED AND PROVIDES MECHANICAL SUPPORT IN AN ELECTRONIC DEVICE

(71) Applicant: Plume Design, Inc., Palo Alto, CA (US)

(72) Inventors: Miroslav Samardzija, Mountain View, CA (US); Tommy Chu, Hsinchu County (TW); John Liu, New Taipei (TW); Liem Hieu Dinh Vo, San Jose, CA (US)

(73) Assignee: PLUME DESIGN, INC., Palo Alto, CA (US)

(*) Notice: Subject to any disclaimer, the term of this patent is extended or adjusted under 35 U.S.C. 154(b) by 205 days.

(21) Appl. No.: 17/969,151

(22) Filed: Oct. 19, 2022

(65) Prior Publication Data

US 2024/0136711 A1 Apr. 25, 2024
US 2024/0235022 A9 Jul. 11, 2024

(51) Int. Cl.

*H01Q 5/30* (2015.01)
*H01Q 1/02* (2006.01)
*H01Q 1/22* (2006.01)
*H01Q 1/48* (2006.01)
*H01Q 5/25* (2015.01)

(52) U.S. Cl.

CPC ................. *H01Q 5/30* (2015.01); *H01Q 1/02* (2013.01); *H01Q 1/2291* (2013.01); *H01Q 1/48* (2013.01); *H01Q 5/25* (2015.01)

(58) Field of Classification Search

CPC .......... H01Q 5/30; H01Q 1/02; H01Q 1/2291; H01Q 1/48; H01Q 5/25; H01Q 9/42
See application file for complete search history.

(56) References Cited

U.S. PATENT DOCUMENTS

| | | | |
|---|---|---|---|
| 6,853,197 | B1 | 2/2005 | McFarland et al. |
| 6,961,545 | B2 | 11/2005 | Tehrani et al. |
| 7,245,882 | B1 | 7/2007 | McFarland |
| 7,245,893 | B1 | 7/2007 | Husted et al. |
| 7,251,459 | B2 | 7/2007 | McFarland et al. |
| 9,136,937 | B1 | 9/2015 | Cheng et al. |
| 9,160,584 | B1 | 10/2015 | Kavousian et al. |
| 2013/0090057 | A1 | 4/2013 | Green et al. |
| 2013/0293424 | A1 | 11/2013 | Zhu et al. |
| 2014/0009344 | A1 | 1/2014 | Zhu et al. |
| 2014/0009355 | A1 | 1/2014 | Samardzija et al. |
| 2014/0112511 | A1 | 4/2014 | Corbin et al. |
| 2014/0226572 | A1 | 8/2014 | Thota et al. |

(Continued)

*Primary Examiner* — Daniel D Chang
(74) *Attorney, Agent, or Firm* — Nicholas Martin; Greenberg Traurig, LLP

(57) ABSTRACT

An antenna for an electronic device comprising of a metal-sheet antenna and an antenna feed connecting the metal-sheet antenna to a radio frequency (RF) printed circuit board (PCB). A screw configured to operate as a ground feed for the metal-sheet antenna and to provide mechanical support in the electronic device wherein the screw is further configured to provide radiation for additional bands for the antenna. The metal-sheet antenna supports a first band, and the screw supports a second band, based on dimensions of a screw boss, and a third band, based on a gap between the screw boss and the metal-sheet antenna.

18 Claims, 15 Drawing Sheets

(56) References Cited

U.S. PATENT DOCUMENTS

| | | | |
|---|---|---|---|
| 2014/0340265 | A1 | 11/2014 | Vazquez et al. |
| 2015/0099474 | A1 | 4/2015 | Yarga et al. |
| 2015/0109167 | A1 | 4/2015 | Yarga et al. |
| 2015/0195836 | A1 | 7/2015 | Malkin et al. |
| 2015/0302976 | A1 | 10/2015 | Chang et al. |
| 2015/0303568 | A1 | 10/2015 | Yarga et al. |
| 2015/0311579 | A1* | 10/2015 | Irci ........................ H01Q 13/10 343/702 |
| 2015/0311960 | A1 | 10/2015 | Samardzija et al. |
| 2016/0056526 | A1* | 2/2016 | Li ............................ H01Q 9/42 343/702 |
| 2016/0336643 | A1 | 11/2016 | Pascolini et al. |

* cited by examiner

200

INTEGRATED SHEET-METAL ANTENNA WITH CARRIER SCREW WHICH OPERATES AS A GROUND FEED AND PROVIDES MECHANICAL SUPPORT IN AN ELECTRONIC DEVICE

FIELD OF THE DISCLOSURE

The present disclosure generally relates to antenna systems and methods. More specifically, the present disclosure relates to an integrated sheet-metal antenna with mechanically supported carrier screw which operates as a ground feed for the antenna and provides mechanical support in the electronic device.

BACKGROUND OF THE DISCLOSURE

Various devices utilize antennas for wireless communication, such as wireless Access Points (APs), streaming media devices, laptops, tablets, and the like (collectively "wireless devices"). Recently, the demand for antennas for mobile wireless applications has increased dramatically, this is driven in part by the Internet of Things (IoT) market. IoT devices include sensors, processing ability, and software applications that connect and exchange data with other devices over the internet or other similar communication networks. Every IoT device requires at least one antenna, and since IoT devices are expected to operate with many different devices at many different frequency bands, IoT devices can include multiple antennas in one small form device.

There exist many ways of implementing antennas into a wireless product. The typical existing implementing means include printed circuit board (PCB), flexible PCB (flex PCB), using metallic enclosures themselves, laser direct structuring (LDS), and stamped metal-sheet. Stamped metal-sheet antennas can be surface mounted on a PCB, which in the industry is known as surface mount technology (SMT). An electronic component mounted in this manner is referred to as a surface mount device (SMD). This SMT approach replaced the through-hole technology (THT) mainly because it is better suited for automated assembly techniques. The typical soldering technique used in SMT is reflow soldering wherein a solder paste is used temporarily to attach component(s) to their contact pads, after the entire assembly is heated and the solder reflows in a molten state creating the permanent solder joints. Stamped metal-sheet antennas can also be connected to the PCB by screws between the antenna and the PCB or attaching the antenna to a component carrier. A component carrier acts as a connecting element between a PCB and the antenna and can provide benefits such as ease of replacement and reducing assembly time and costs. The stamped metal-sheet antenna implementation requires mechanical support for the antenna, this can be accomplished by the SMT connection to the PCB, screwing the antenna to the PCB, or attaching it to a component carrier.

The challenge with implementing metal-sheet antennas into a small form wireless device compared to other antenna types such as PCB, flex PCB, or LDS is that the metal sheet requires a mechanical supporting means as it is not embedded in another stable component such as a trace on a PCB. As antenna design gets more complex and implemented into smaller form devices eliminating unnecessary components or combining functionality of multiple components into fewer elements frees up space inside the enclosure and also makes assembly and fabrication faster and less expensive.

This drive for efficient use of interior space combined with a continued desire to automate assembly is especially evident with fasteners such as screws. Many small screws can require robotic assemblers to move in the horizontal and vertical direction in addition to a rotational movement to achieve the fastening. If fasteners such as screws can be reduced in the assembly, it can result in not only a cost savings but also a potential to add additional devices such as additional antennas that would not otherwise be possible.

BRIEF SUMMARY OF THE DISCLOSURE

The present disclosure includes an antenna for an electronic device comprising of a metal-sheet antenna and an antenna feed connecting the metal-sheet antenna to a radio frequency (RF) printed circuit board (PCB). A screw configured to operate as a ground feed for the metal-sheet antenna and to provide mechanical support in the electronic device wherein the screw is further configured to provide radiation for additional bands for the antenna.

This section will be the CLAIMS at the end rewritten in paragraph form once finalized

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure includes an antenna for an electronic device comprising of a metal-sheet antenna and an antenna feed connecting the metal-sheet antenna to a radio frequency (RF) printed circuit board (PCB). A screw configured to operate as a ground feed for the metal-sheet antenna and to provide mechanical support in the electronic device wherein the screw is further configured to provide radiation for additional bands for the antenna.

Wireless Smart Device Operating Frequencies and Protocols

IoT (smart) devices typically utilize frequency bands for short range and mid-range connectivity. There exist several applications for wireless communications that require a wide range of frequency bands. Short range connectivity is most common in IoT applications and include protocols such as Bluetooth and Zigbee (2.4 GHz to 2.485 GHz), Near-Field Communication (NFC) (13.56 MHz), Wi-fi (2.4 GHz to 5 GHz), and 5G (5.15 GHz to 5.85 GHz). Ultra-wideband (UWB) can utilize a large frequency band (3.1 GHz to 10.6 GHz) that is broken down into physical bands provided as channels as defined by the WiMedia Alliance PHY specification.

The Matter protocol uses existing standards such as Wi-fi and Bluetooth for initial pairing and thread protocol that connects products from different brands without the need for a hub. Matter operates at 2.4 GHz similar to Wi-fi, Bluetooth, and Zigbee. Matter is new in the industry and is being developed to create a standard communication platform for smart devices to interface with one another.

It should be noted that antenna elements must be physically dimensioned to match the operating wavelength, and antenna size is inversely proportional to frequency, therefore the lower the operational frequency the larger the antenna that is required to operate at that frequency. Small intuitive configurations for antennas to receive radio waves in many different positions is a large part of antenna design in smart devices. Reducing the number of components and combining functionality of antenna components in a smart device can allow antenna designers to utilize the small form space required to operate at multiple frequencies and in multiple positions.

Metal-Sheet Antenna Mechanical Supporting Methods

Figure 1:
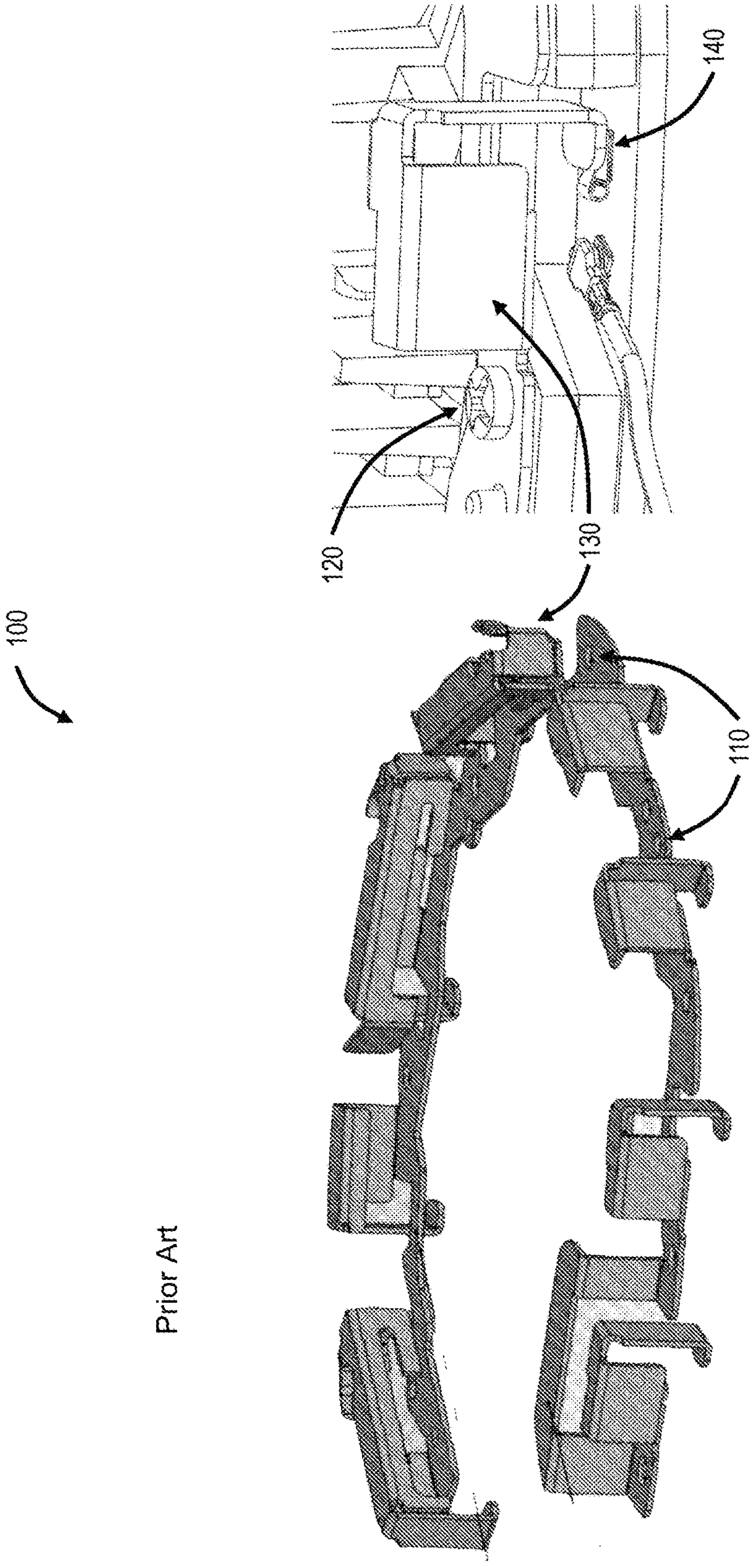
FIG. 1 is a perspective view of an existing industry metal-sheet antenna with screws acting as the mechanical supporting means.

Stamped metal-sheet antennas can be implemented into a wireless device by securing with screws. FIG. 1 is an illustration of an existing metal-sheet antenna 130 installed in a wireless device with screws 120 that act as a mechanical support for securing the metal sheet and serves as the attachment method to aid in connection of the PCB or metallic ground. The antenna feed connection to the PCB is shown on 140 as a spring or similar metallic contact. This particular metal-sheet antenna configuration and size requires many screws to be placed along the metal-sheet to provide adequate mechanical support. The screw holes 110 are shown throughout the metal-sheet and in this particular antenna design the screws 120 mount the antenna to the heat sink by using the screw holes 110. Different antenna configurations may use the screws different ways, as shown in 100 the screws 120 are independent of the antenna operation and are only used for mechanical support.

Figure 2:
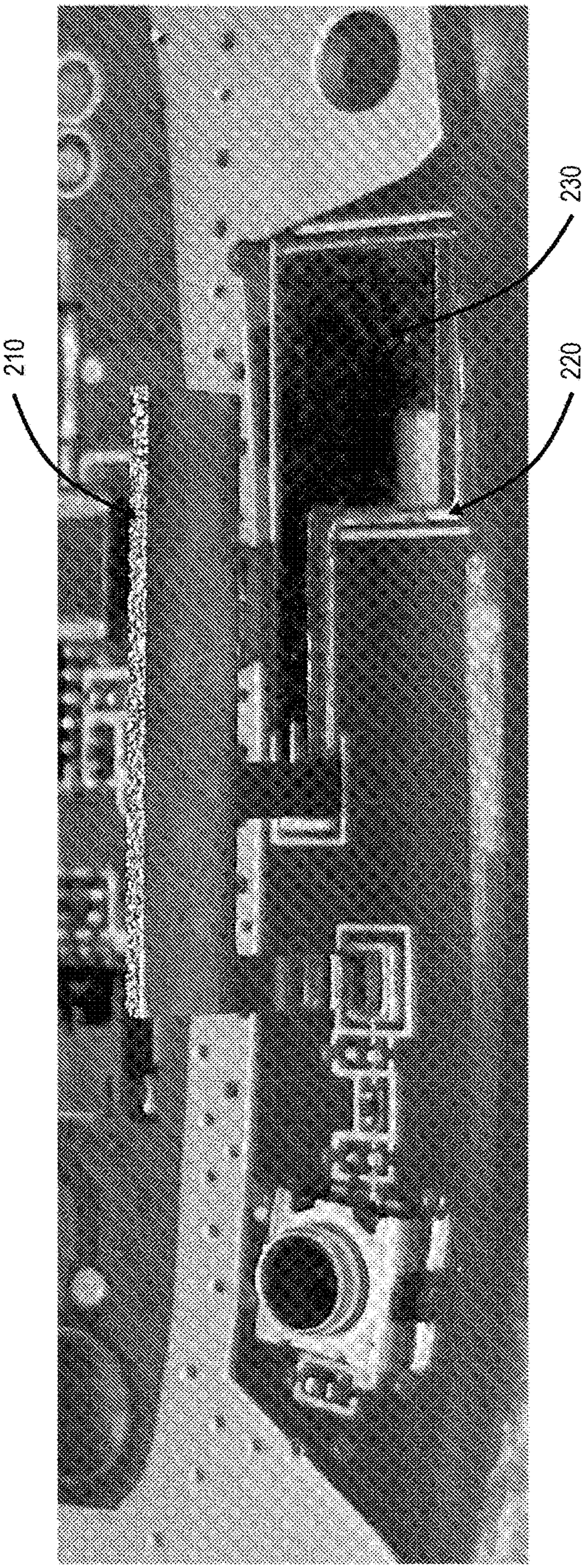
Prior Art FIG. 2
FIG. 2 depicts an existing industry metal-sheet antenna with SMT acting as the mechanical supporting means.

In another example, stamped metal-sheet antennas can be implemented into a wireless device by surface mounted on a PCB, which in the industry is known as surface mount technology (SMT). The typical soldering technique used in SMT is reflow soldering which a solder paste is used temporarily to attach component(s) to their contact pads, after the entire assembly is heated and the solder reflows in a molten state creating the permanent solder joints. As illustrated in FIG. 2 the metal sheet antenna 210 is shown elevated above the PCB and attaches to the PCB board or metallic ground with SMT 220. The SMT provides the electrical connection in addition also provides the mechanical support for the antenna to be raised above the PCB or metallic ground and allows the antenna to transfer energy in the form of radiation. The large metal foot 230 provides mechanical support for the elevated stamped sheet.

Figure 3:
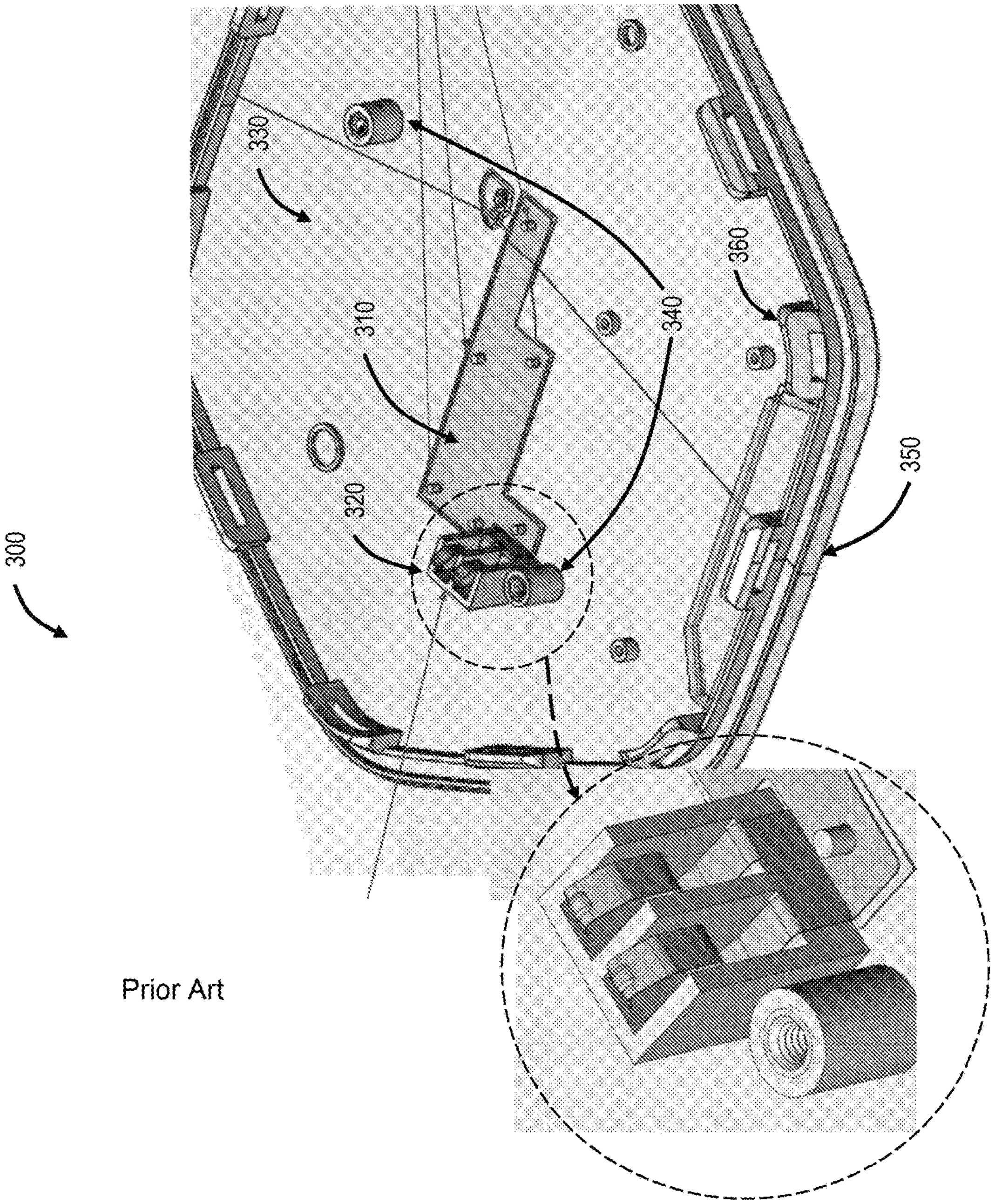
Prior Art FIG. 3
FIG. 3 depicts an existing industry metal-sheet antenna with glue or heat-staking acting as the mechanical supporting means.

In yet another example, stamped metal-sheet antennas can be implemented into a wireless device by glue or heat-staking the metal-sheet to a dielectric carrier 300. A component carrier, or as shown in FIG. 3 a dielectric carrier 330 acts as a connecting element between a PCB and the antenna 310 and can provide benefits such as ease of replacement and reducing assembly time and costs. The metal-sheet antenna 310 is shown with antenna feed and short spring 320 which is the connection to the PCB. The short is used to tune and match the antenna circuit and adds parallel inductance to the antenna circuit to match the circuit capacitance. Heat staking is the process of joining two dissimilar materials together using heating and cooling to raise the temperature of the components and allow reforming of the materials to join them together. Observed in 300 is the raised screw channel 340 where the screws are used to fasten the dielectric carrier 330 to the enclosure 350. The snap hooks 360 shown on the outside of the wireless device enclosure 350 further serve as a fastening method. The screws that utilize the raised screw channel 340 are independent of the antenna operation and only serve as a mechanical supporting means.

Metal-Sheet Antenna Circuit Structure—Integrated Ground Feed Screw

Figure 4:
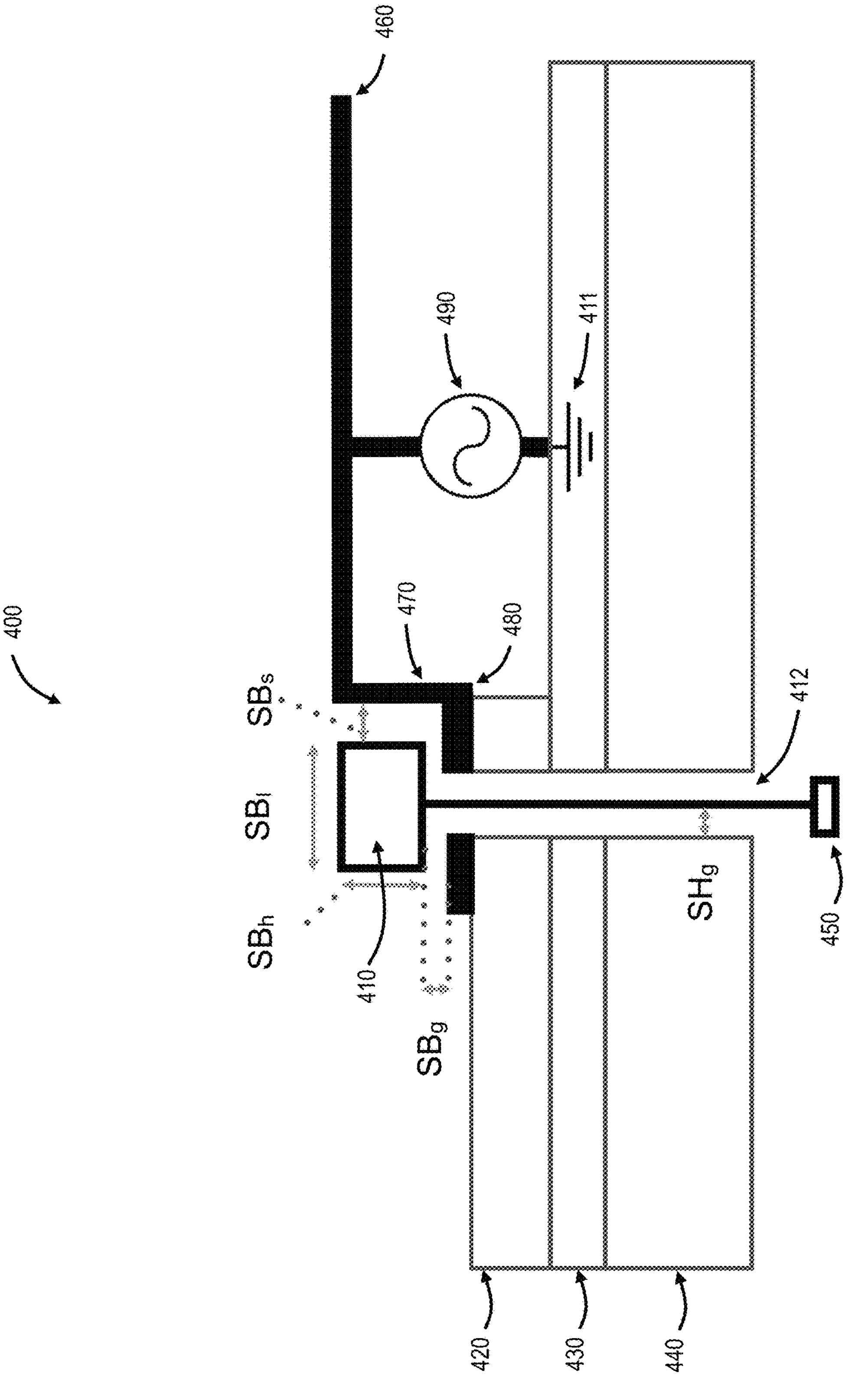
FIG. 4 is a circuit diagram of the sheet-metal antenna implemented with a mechanically supporting carrier screw as described in the disclosed.

FIG. 4 depicts a circuit diagram for an antenna circuit oriented on a wireless device illustrating a ground screw 450 which serves as a mechanically supporting carrier screw. The antenna circuit shown includes an antenna 460, antenna short 470, and an antenna short foot 480 which is oriented underneath a screw boss 410. A screw boss is a feature commonly found in injection molding which aids in the assembly by providing a threaded channel for the screw 450. The antenna feed 490 exists between the antenna 460 and the ground 411 which is shown on the radio frequency (RF) PCB 430. The antenna circuit shown is a classic Inverted-F (IFA)/Planar Inverted-F (PIFA) type antenna. IFA/PIFAs consist of a monopole antenna running parallel to a ground plane 411, grounded/shorted at one end in the shape of an inverted F. The IFA/PIFA antenna arrangement includes a bent antenna which capacitively couples to the ground plane, therefore a shorting connection 470 is included between the antenna and ground which acts as a parallel inductance. This screw 450 is designed and implemented to achieve mechanical support of the metal-sheet antenna and used as a ground screw 450 to achieve radiation for additional frequency bands. The screw is installed inside a screw cavity 412 which provides a gap ($SH_g$), between the wireless device components and the screw threads.

In the circuit shown in 400, AC coupling occurs in the screw boss 410 which functions as a parasitic capacitance to the sheet-metal antenna. Parasitic capacitance exists between two nearby conductive elements possess different charge levels such as what occurs between the metallic screw boss 410 and the antenna short 470. Furthermore, the ground screw 450 is integrated into the wireless device to mechanically reinforce the entire structure of the product including PCBs 430 and heat spreaders 420 and 440, etc.). As illustrated the screw 450 and screw boss 410 being metallic allows those components to be used in the antenna circuit as well as provide mechanical support for the antenna circuit. The screw 450 and screw boss 410 are positioned in close proximity to the antenna short 470, this allows the screw boss 410 to couple with the antenna ground, excite the screw boss, and radiate energy and act as part of the antenna circuit. As illustrated in 320, the existing industry antenna implementation 300 depicts the antenna feed and short (320) separate from the screw boss 340. By using this screw boss 410 as part of the antenna short it reduces the number of components used in the wireless device and would save time and money during assembly. Since the screw and screw boss function as a radiating component of the antenna, the antenna can be tuned by manipulating the gap between screw boss 410 and antenna short 470 (referred to in the figure as $SB_S$), manipulating the physical height ($SB_h$) and width ($SB_l$) of the screw boss 410 and manipulating the gap between the screw boss 470 and the antenna short foot 480 ($SB_g$).

Figure 5:
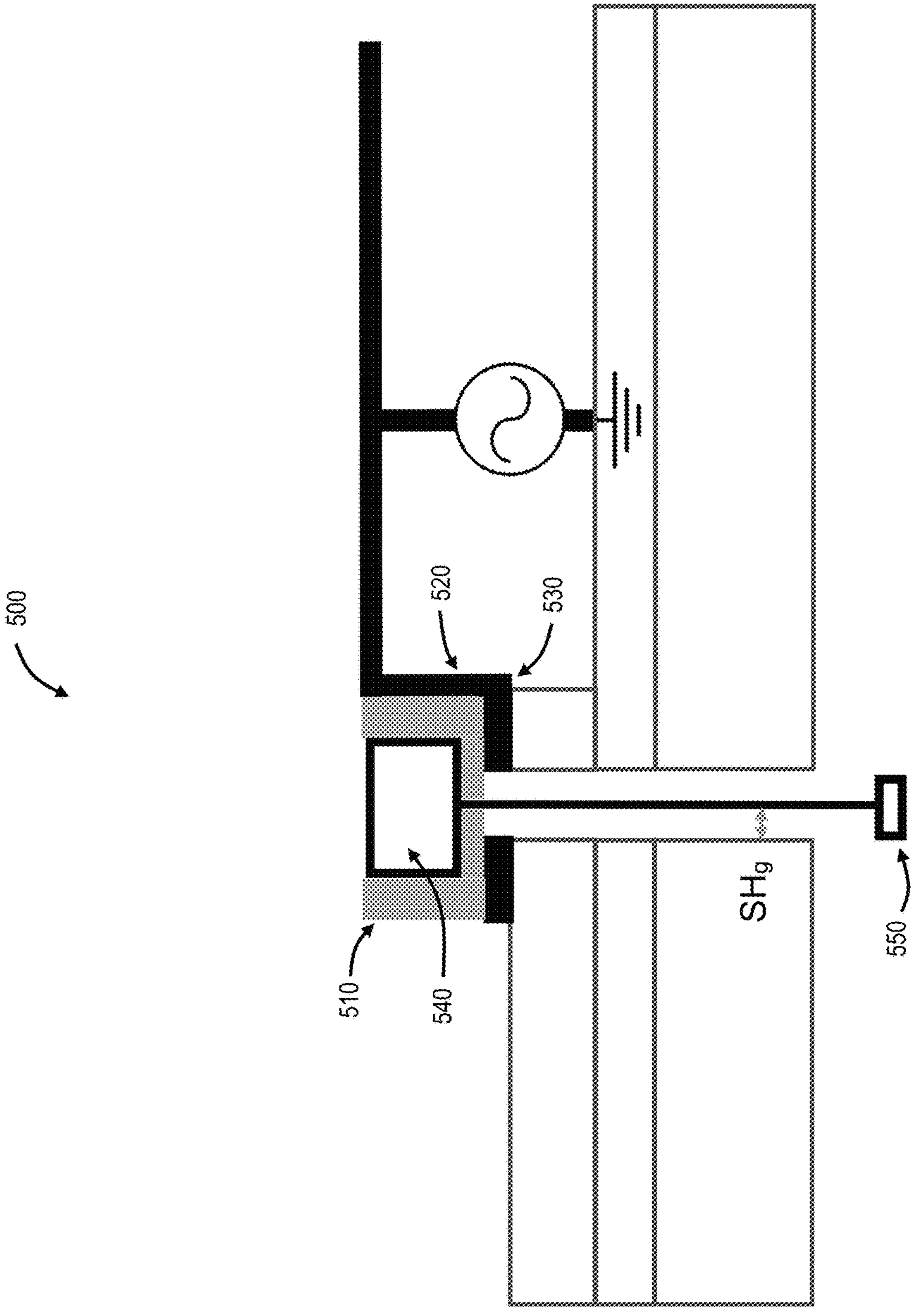
FIG. 5 is a circuit diagram of the sheet-metal antenna implemented with a carrier screw and an insulator between the ground screw boss and the antenna.

FIG. 5 illustrates the same antenna circuit diagram illustrated in 400 with a screw boss insulator 510 implemented between the antenna short 520, antenna short foot 530, and the screw boss 540. This dielectric insulator 510 can serve as the mechanical carrier that combines the antenna elements and screw boss 540 together allowing the antenna to be assembled and secured in place by the screw 550 alone. This design allows the cover of the wireless device to be mounted independently of the antenna assembly as the dielectric insulator is only necessary to fill the gap between the antenna short 520/antenna short foot 530 and the screw boss 540. Since the cover does not hold in the antenna circuit the cover may not be needed at all for the wireless device to operate. Utilizing this screw 550 for mechanical support as well as integrated as part of the antenna allows flexibility for assembly of other components such as the cover of the wireless device. This dielectric insulator also aids in keeping the screw boss 540 electrically floating in respect to the antenna short 520/antenna short foot 530 which allows the screw boss to be excited by the PIFA/IFA antenna circuit.

Figure 6:
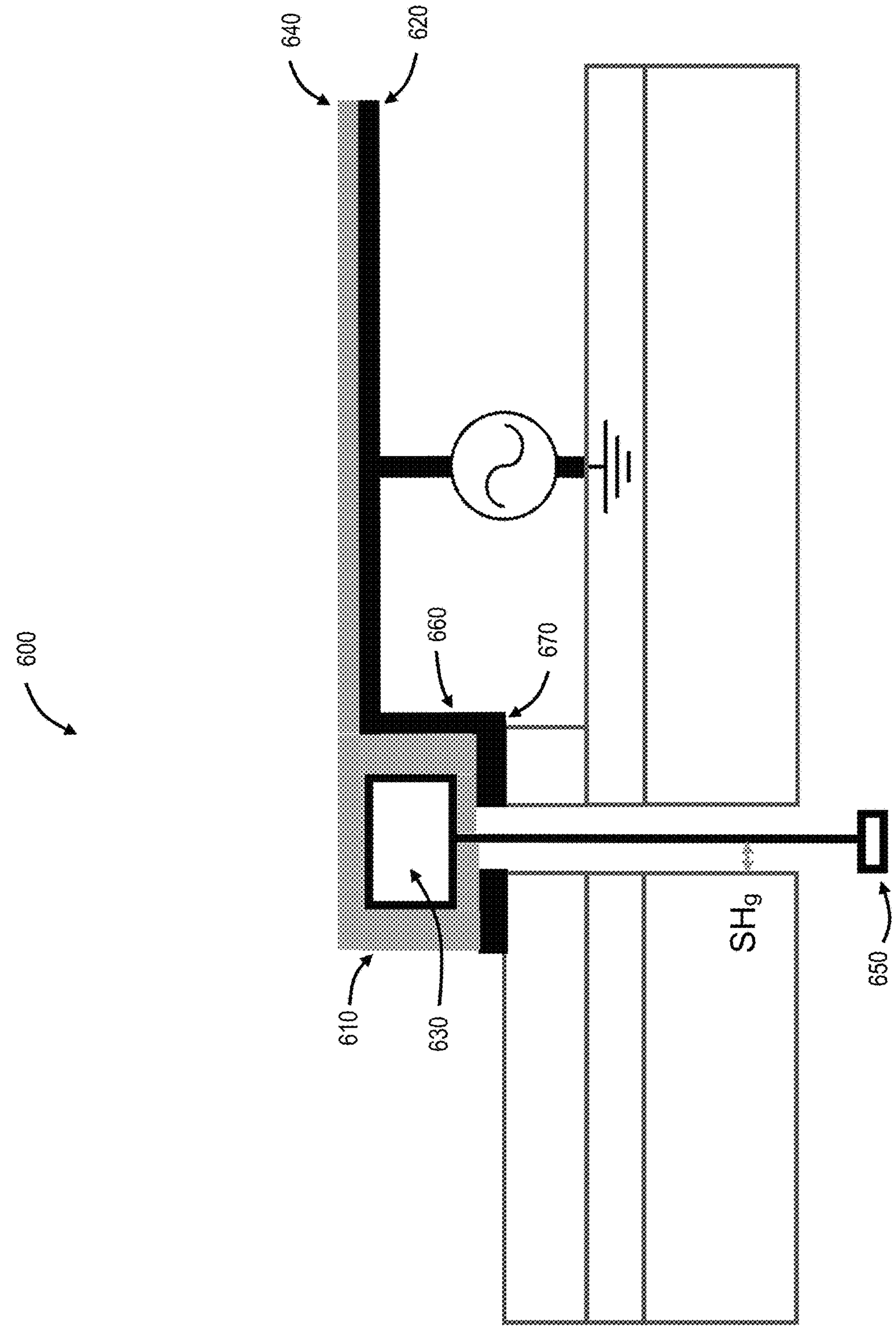
FIG. 6 is a circuit diagram of the sheet-metal antenna implemented with a carrier screw and the insulator extended from the ground screw boss to the PIFA/IFA antenna.

FIG. 6 further depicts the antenna circuit implemented on the wireless device with the insulator 610 extended to cover the antenna 620 and acts as an antenna carrier 640. The screw boss 630 and the antenna carrier 640 can be implemented into the product industrial design enclosure as a single piece in the assembly process. The screw 650 will hold the product industrial design enclosure in place. This gives the flexibility to allow the wireless device to not have a separate component to act as the enclosure lid or cover as the insulator 610,640 can act as a cover or lid for the wireless device. The antenna 620, antenna short 660, and antenna short foot 670 are all part of the same piece that is combined with the screw boss 630 with the dielectric insulator (610, 640) acting as the carrier to combine those components into one assembly held in place by the ground screw 650.

Figure 7:
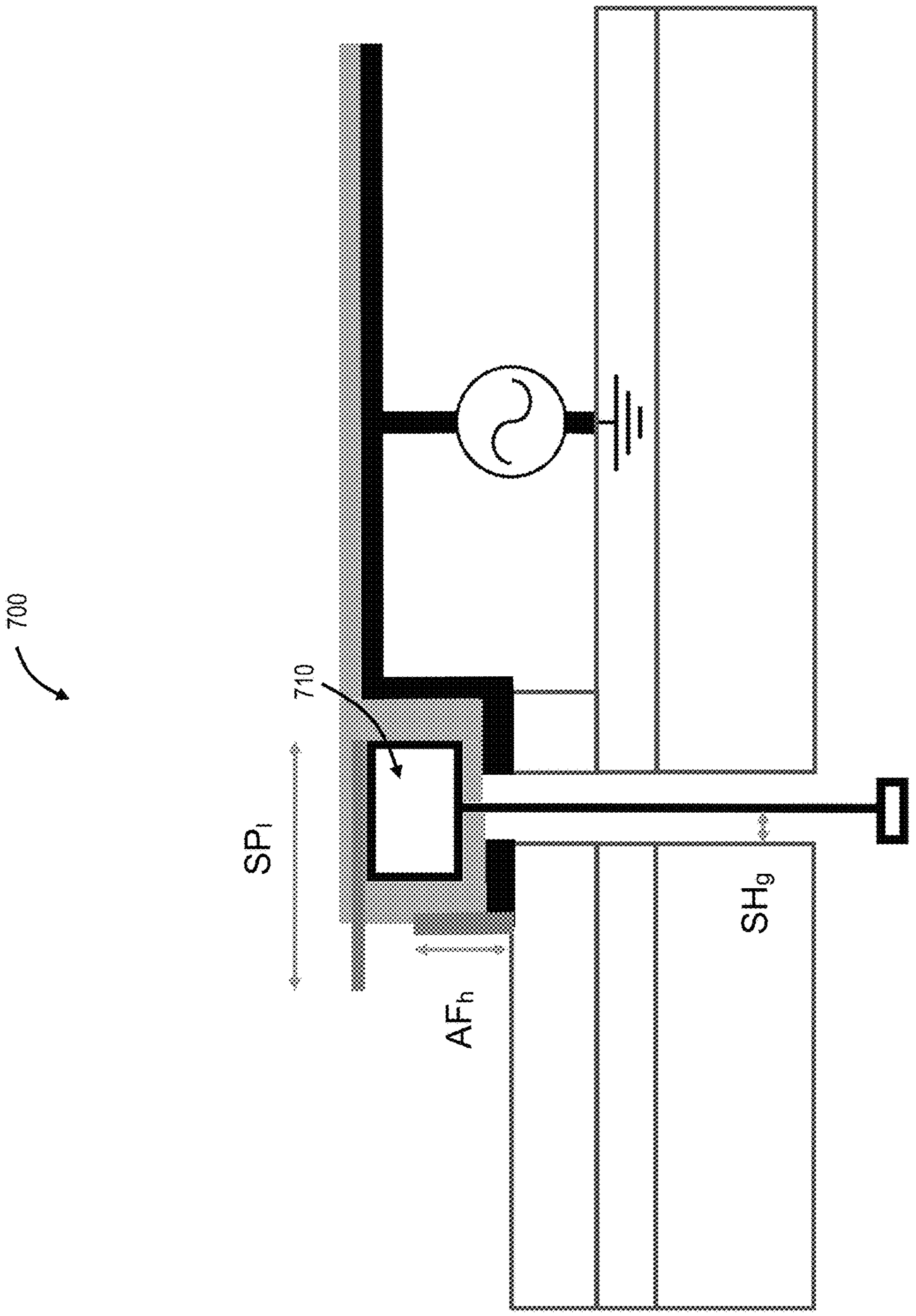
FIG. 7 is a circuit diagram of the sheet-metal antenna in FIG. 6 illustrating how varying the characteristics of the screw boss can affect the output of the antenna.

FIG. 7 depicts the same circuit shown in 600 illustrating how varying the characteristics of the screw boss 710 can affect the output of the antenna. The screw boss 710 width can be extended as shown ($SP_l$) where the width or diameter of the screw boss is illustrated as the bold line above the screw boss. The screw boss width can be used to tune the antenna circuit. Similarly, $AF_h$, which is illustrated by a bold line with double arrow measurement represents another adjustment that can be made to the antenna circuit that can provide tuning for the antenna. The screw boss 710 can be fabricated and assembled as a certain width that is predesigned or the screw boss 710 width ($SP_l$) can be modified after the assembly process by adding copper tape or other means to extend it and get the tuning of the specific antenna that is desired.

Metal-Sheet Antenna Circuit Current Distributions

Figure 8:
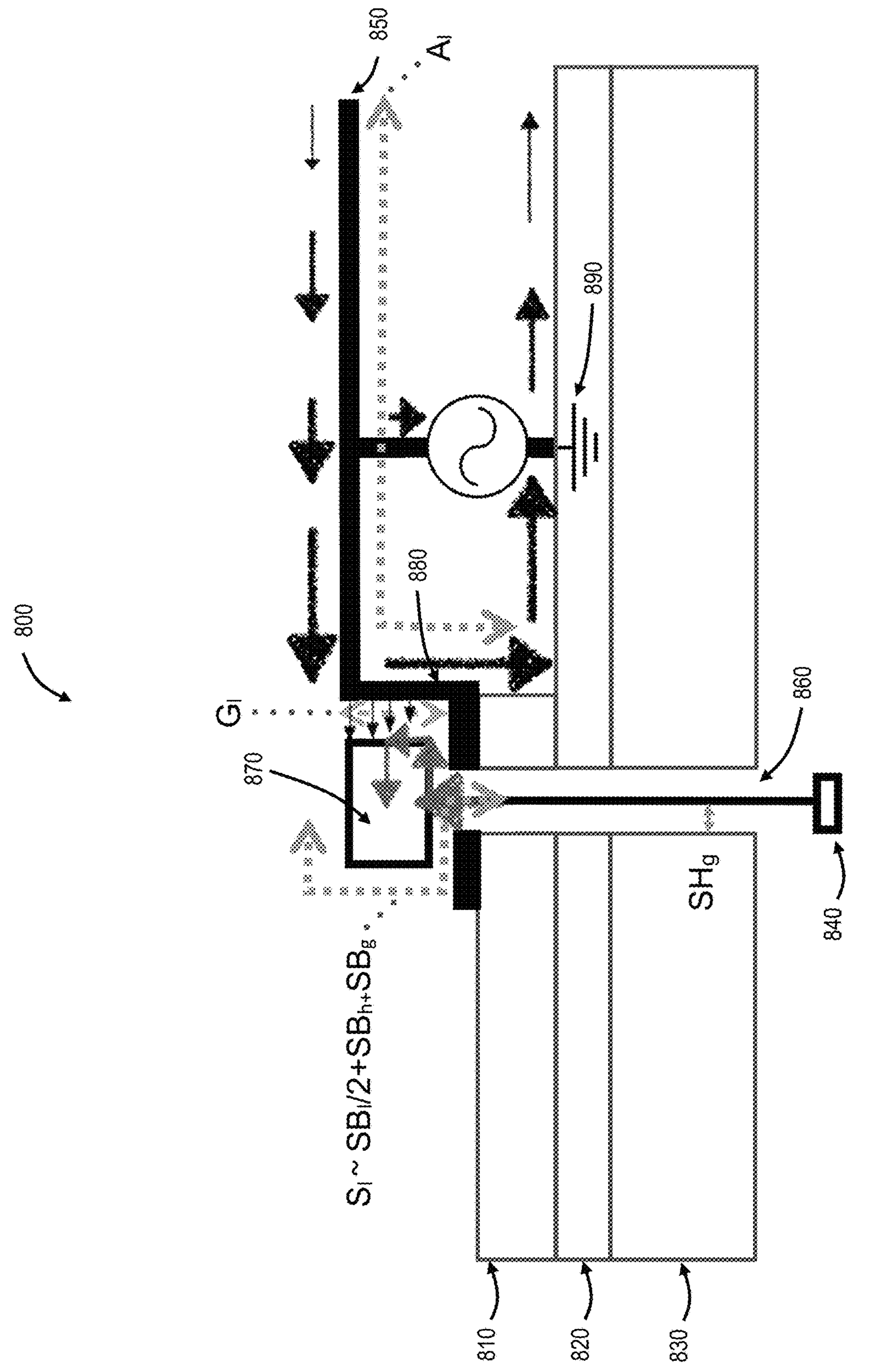
FIG. 8 depicts how energy is flowing along the sheet-metal antenna circuit, screw, and screw boss.
Figure 9:
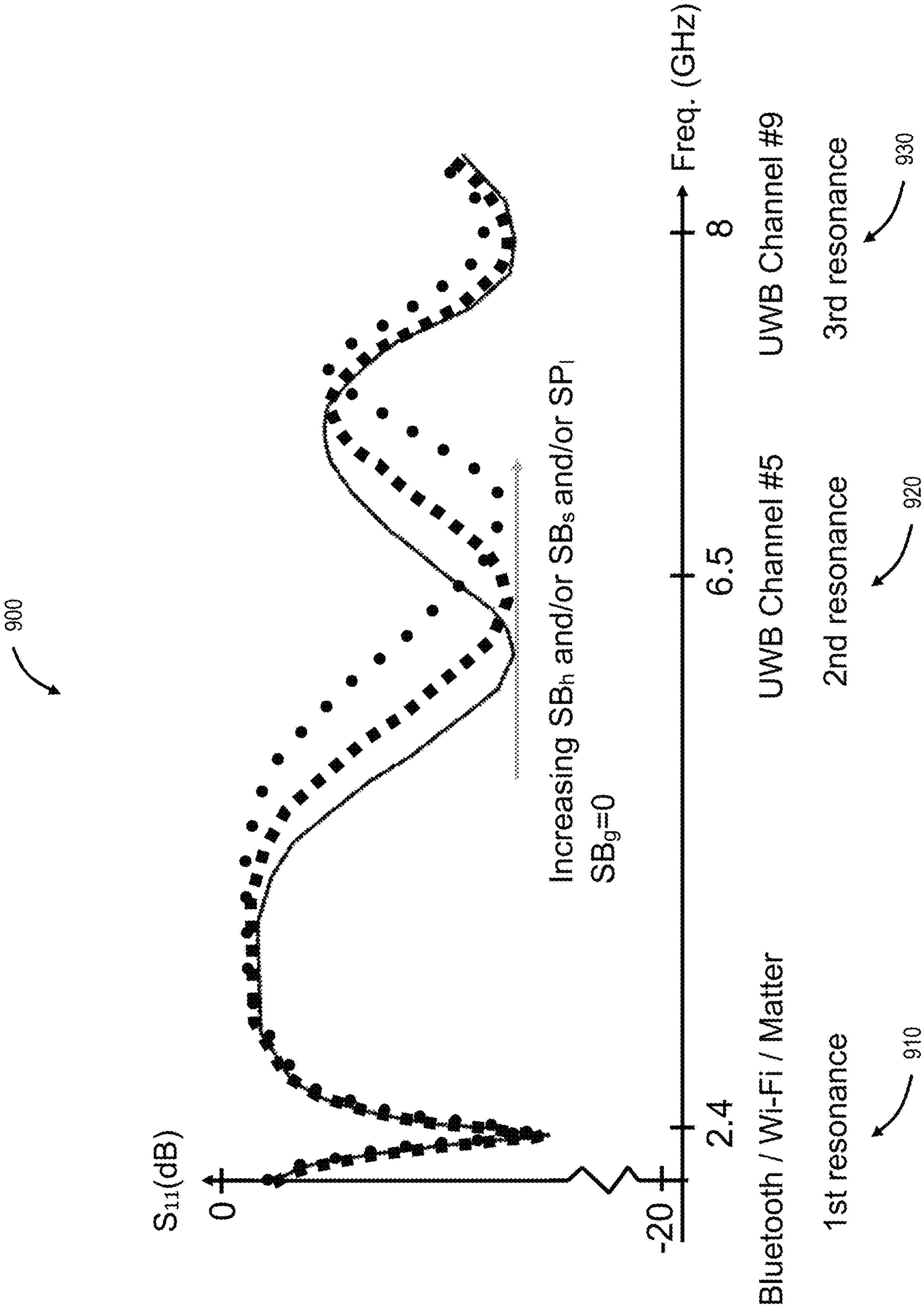
FIG. 9 is a frequency response graph for the antenna circuit shown in FIG. 8.

FIG. 8 depicts how energy is flowing along the antenna circuit as well as along the screw 840 and screw boss 870. As shown the antenna 850 in this example is a typical Inverted-F (IFA)/Planar Inverted-F (PIFA). There exist three radiating resonances that occur in this single circuit arrangement by utilizing one PIFA/IFA antenna and the ground feed screw. The first resonance is provided by the PIFA/IFA antenna element 850. This first resonance can be tuned by controlling the length ($A_l$ shown as a dashed line with arrows on each end), from the end of the antenna down to the antenna short 880 and then to ground 890. The length ($A_l$) is set roughly to quarter wavelength at the desired frequency. For a desired frequency of 2.4 GHz, the length ($A_l$) is approximately $\lambda$=30 mm [c/frequency, where c is the speed of light (299,792,758 m/s, $\lambda/4$ for quarter wavelength). The 2.4 GHz first resonance can be used for Bluetooth, Wi-Fi, or Matter. The currents associated with the first resonances are shown as dark lines that flow along the antenna circuit 850 and depict the electric field.

The second resonance is controlled by the currents flowing on the screw 840 and the screw boss 870. The dimensions of the screw boss which include diameter, length, width, and height and the screw gap near the screw boss determine the resonance length. The resonant length is quarter wavelength at operating frequency, therefore at 6.5 GHz (UWB channel #5), the $S_l$, which represents the overall length shown in dotted double arrow line from the screw boss down to the screw, is approximately 11 mm. $S_l \sim SB_l/2+SB_h+SB_g$, where $SB_l$ (screw boss width), $SB_h$ (screw boss height), $SB_g$ (gap between the screw boss 470 and the antenna short foot 480) are dimensions as shown in 400. The currents associated with this screw 840 and screw boss 870 are shown in 800. It should be noted that the screw boss 870 is floating and is not in contact with the antenna short or short foot therefore can be considered a passive radiator or a parasitic element. Parasitic elements are conductive elements that are not in electrical contact with anything but will form between any conductive elements that carry a charge, in this case the current is coupled between the screw boss 870 and the antenna short 880, wherein the antenna short provides the charge. The screw is installed in a cavity 860 that exists between the wireless device components such as heat spreaders (810,830) and PCB (820) to keep the screw electrically floating. The current that results from the coupling is directed up the screw 840 into the screw boss in a counterclockwise direction as shown by arrows in 800.

The third resonance is the electric field created by the gap between the screw boss 870/screw 840 and the antenna short element 880. The third resonance is created by the electric field as shown by the arrows between the antenna short element 880 and the screw boss 870. The screw boss 870 and antenna short element 880 is separated by a dielectric such that there is no contact between the two, but the electric field is inducted between the two elements. This third resonance can be controlled by the length $G_l$ which is shown as a dotted double arrow line on the illustration 800 which can be adjusted by modifying the screw boss 870 size. Since the screw 840 is installed from the underside of the heat spreader 830 modifying the screw boss would be very easy and not affect other components in the assembly. This circuit configuration acts as an open slot radiator and the resonance length is set to quarter wavelength. To achieve 8 GHz (UWB channel #9) the $G_l$ is approximately 9 mm.

The circuit diagram with electrical fields shown in 800 depicts a traditional IFA/PIFA antenna with resonance, the screw 840/screw boss 870 provides a second resonance since it is electrically floating in respect to the PIFA/IFA, and the third resonance is created by the field between the screw boss and the antenna short. By utilizing this screw (which traditionally would be separate from the antenna electrical circuit) into the antenna circuit it not only combines components making assembly less complex, but it also allows multiple antennas acting at multiple frequencies to be utilized from a traditional single PIFA/IFA antenna design. The screw 840 and screw boss 870 can be adjusted to tune the antenna circuit in addition to providing a mechanical support to secure the antenna to the other wireless components such as the heat spreaders (810,830) and the PCB (820).

Antenna Structure Tuning

The three resonances that exist with the antenna configuration shown in 800 are shown on the frequency response graph (900). The first resonance occurs at the PIFA/IFA antenna and can be tuned by controlling the length of the antenna to the desired frequency, in this case the desired frequency is 2.4 GHz to support Bluetooth, Wi-Fi, and Matter (910).

The second resonance is tuned to a desired frequency of 6.5 GHz to support UWB Channel #5 (920). The frequency is achieved by modifying the dimensions of the screw boss. Since the screw and screw boss functions as a radiating component, the antenna can be tuned by manipulating the gap between screw boss 410 and antenna short 470 ($SB_S$), manipulating the height and width of the screw boss 410 ($SB_l$, $SB_h$), and manipulating the gap between the screw boss 470 and the antenna short foot 480 ($SB_g$). The screw boss 710 width can be extended ($SP_l$) and it can be used to tune the antenna circuit. Similarly, $AF_h$ represents another adjustment that can be made to the antenna circuit that can provide tuning for the antenna (700). Controlling the second resonance is the most difficult however the screw and screw boss provide many tuning options to achieve the desired frequency and give the antenna designer flexibility for achieving many desired frequencies.

The third resonance can be controlled by the length GI as shown in 800 as a dashed double arrow line and can be adjusted by modifying the screw boss 870 size. The third resonance is tuned to 8 GHz to support UWB Channel #9 (930).

Figure 10:
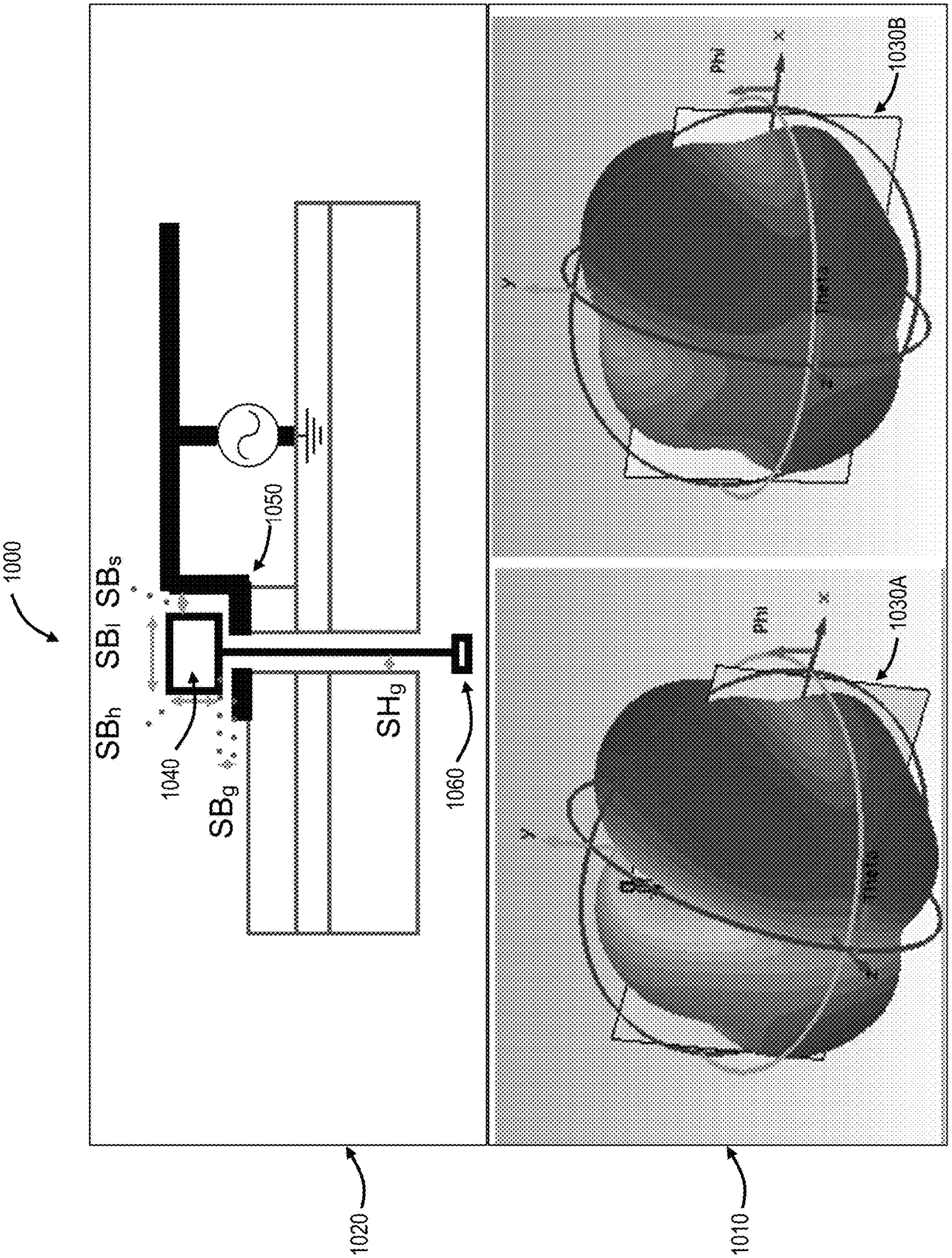
FIG. 10 illustrates radiation patterns for the antenna circuit shown in FIG. 8.

FIG. 10 illustrates radiation patterns for the antenna circuit with the ground screw and ground screw boss implemented as shown in previous figures. The radiation patterns shown are depicted wherein the sheets 1030A, 1030B are in the same plane as the antenna structure shown 1020. The shaded spherical area 1010 is the radiation pattern for the antenna structure 1020 and can be controlled by adjusting $SB_g$ which is the gap between the screw boss 1040 and the antenna short 1050. If the screw boss 1040 is electrically isolated (floating) from the antenna short 1050 ($SB_g$>0 mm) the radiation pattern is split in two and directed in the forward direction (Z-axis), and backward (negative X-axis) as shown on the left-most radiation pattern. If the screw boss 1040 is grounded ($SB_g$=0 mm), the radiation pattern will be directed into the upper hemisphere (Y-axis) as shown on the right-most radiation pattern. $SB_g$ can be set based on the desired radiation direction, the antenna position, and the screw 1060 and screw boss 1040 position.

Metal-Sheet Antenna Circuit Structure Implementation

Figure 11:
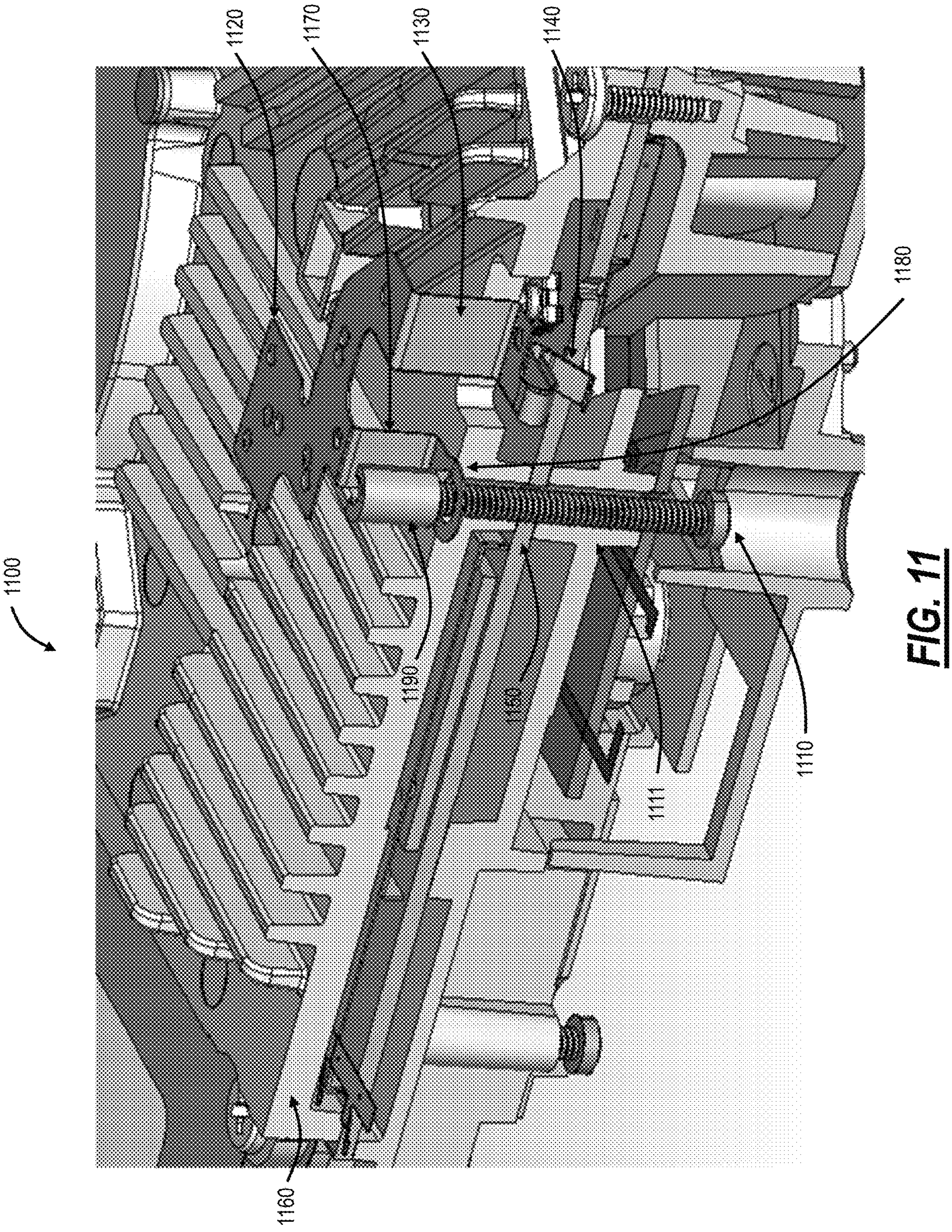
FIG. 11 depicts a section view of the wireless device and the antenna with ground screw and ground boss implemented.

FIG. 11 depicts a section view of the wireless device including the antenna with ground screw 1110 and screw boss 1190 implemented (1100). The metal-sheet antenna is shown 1120, antenna feed 1130, and antenna spring 1140 which is connected to the PCB 1150 where the PCB injects the electrical signal into the antenna. The antenna is mounted very close to the heat spreader 1160, considering that the antenna is electrically charged it acts as a parasitic capacitance with the metallic heat spreader 1160. A short leg 1170 is added to the antenna circuit to create a short loop inductance to counter the parasitic capacitance that is formed between the antenna 1120 and the metallic heat spreader 1160 which are very close to one another but not in contact. The implementation discussed thus far describes a PIFA/IFA antenna as shown on prior figures. Further depicted on the short leg 1170 is a screw hole that exists in the short/ground foot 1180 that allows for the screw 1110 to be attached. The screw 1110 as shown is not in contact with any other components other than the screw boss 1190 as the screw is installed inside a cavity that is fabricated through components such as heat spreaders (1160, 1111) and PCB 1150 and the cavity diameter is larger than the screw diameter. The screw boss 1190 is not in contact with the antenna short foot 1180 and the screw and screw boss can be considered electrically floating. The insulator that would be placed between those components is not shown in this figure.

This implementation of the PIFA/IFA antenna allows the three resonance frequencies to be utilized with a much smaller footprint and reduced components such as reducing the number of screws that are required for mechanical support of the metal-sheet antenna. The first resonance is achieved by utilizing the PIFA/IFA antenna 1120. The screw 1110/screw boss 1190 provides a second resonance since it is electrically floating in respect to the PIFA/IFA, and the third resonance is created by the field between the screw boss 1190 and the antenna short 1180. By utilizing this screw (which traditionally would be separate from the antenna electrical circuit) into the antenna circuit it not only combines components making assembly less complex, but it also allows multiple antennas acting at multiple frequencies to be utilized from a traditional single PIFA/IFA antenna design. The screw 1110 and screw boss 1190 can be adjusted to tune the antenna circuit in addition to providing a mechanical support to secure the antenna to the other wireless components.

Figure 12:
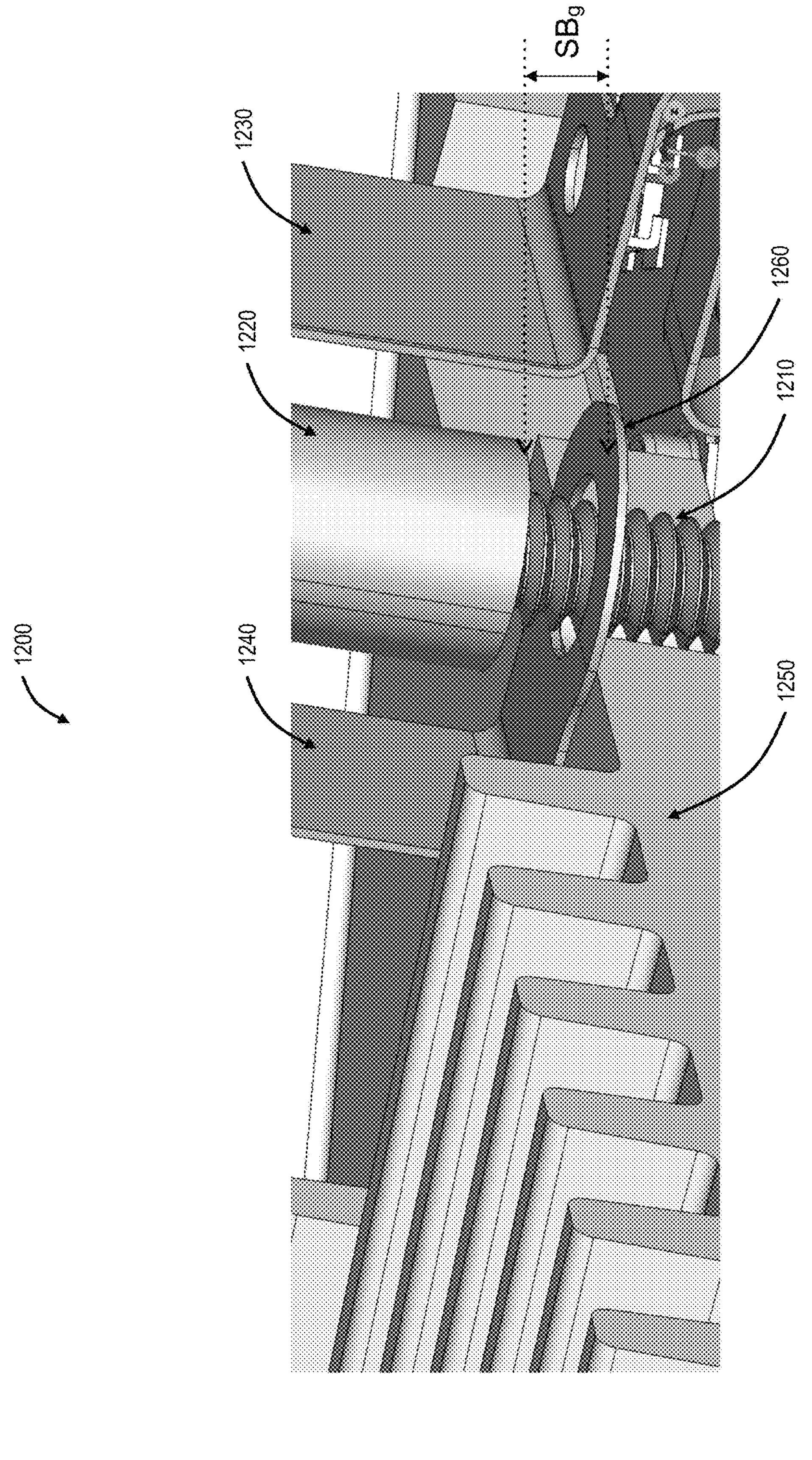
FIG. 12 is a detailed view of the screw and screw boss implemented into the wireless device.

FIG. 12 is a detailed view of the screw 1210 and screw boss 1220 implemented into the wireless device 1200. This view details the antenna feed 1230 and antenna short 1240, omitted from this view is the antenna 1120 which exists between these two items. The screw hole that exists in the antenna short foot 1260 is larger than the screw 1210, and the antenna short 1240 is not in contact with the metallic heat spreader 1250, therefore the antenna is electrically floating. Also omitted from this view is the screw cavity which is also larger than the screw diameter which can be seen in 1100. The gap between the screw boss 1220 and the antenna short foot 1260 is shown as $SB_g$ and can be used to tune the second resonance. This gap ($SB_g$) is further shown as a circuit diagram in FIG. 4 with the screw boss 410 and antenna short foot 480.

Figure 13:
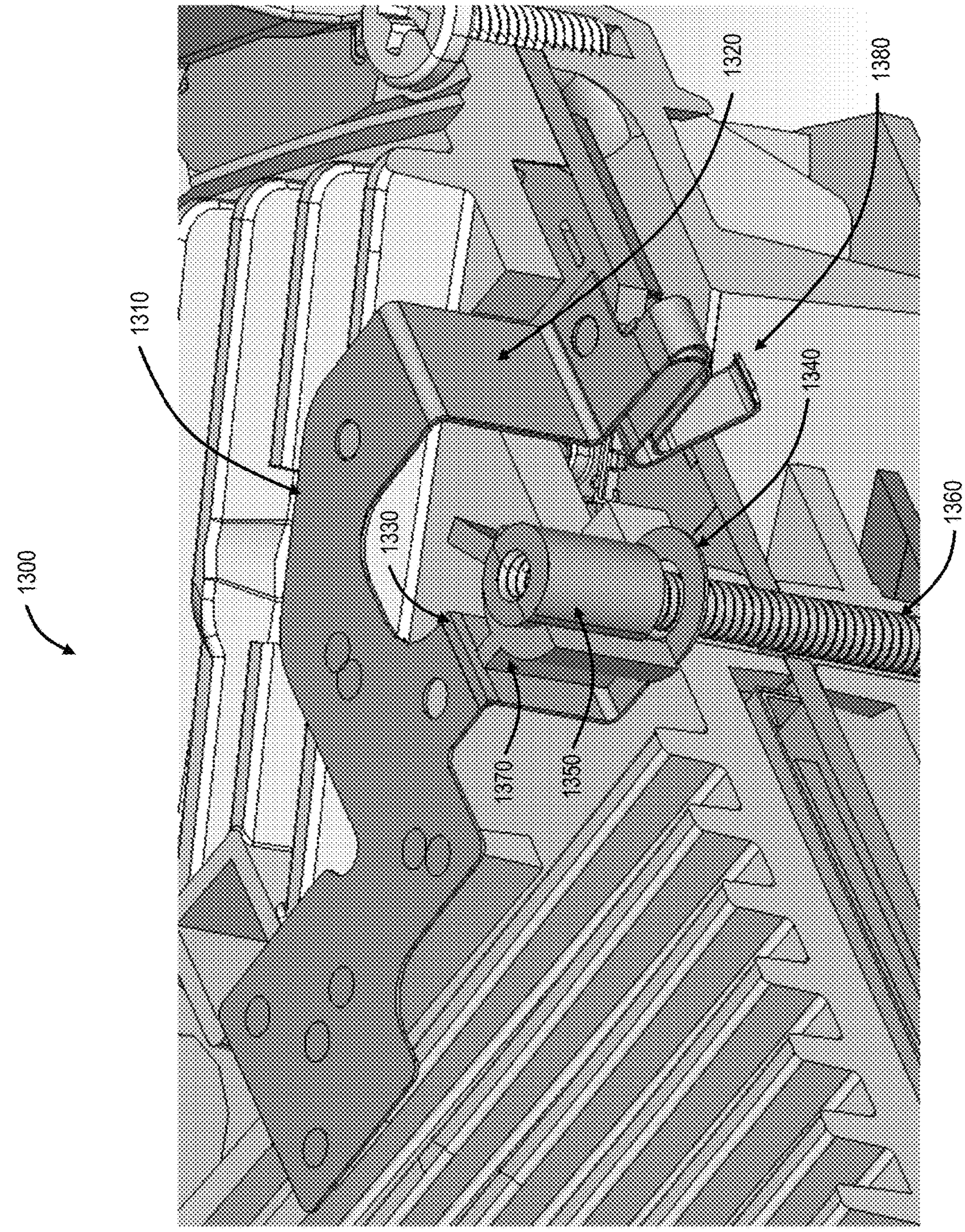
FIG. 13 is a detailed view of the wireless device with the screw boss dielectric insulator implemented.

FIG. 13 is a detailed view of the wireless device with antenna 1310, antenna feed 1320, antenna short 1330, antenna short foot with screw hole 1340, screw boss 1350, and screw 1360. This is the same wireless device as shown in FIG. 11 wherein 1300 includes a screw boss dielectric insulator 1370 which was omitted from 1100 and 1200. This dielectric material will fill the gap between the screw boss 1350 and the antenna short 1330/antenna short foot 1340 either completely or partially. The assembly of the antenna

1310, the antenna spring connection to PCB (1380), antenna short 1330, antenna short foot 1340, antenna feed 1320, screw boss 1350, and dielectric insulator 1370 can be combined into a single assembly piece mechanically supported by the single screw 1360. The dielectric insulator 1370 can act as a physical carrier to combine all the antenna components during assembly. As comparison to this physical implementation, the dielectric insulator is also shown in FIG. 5 as 510.

Figure 14:
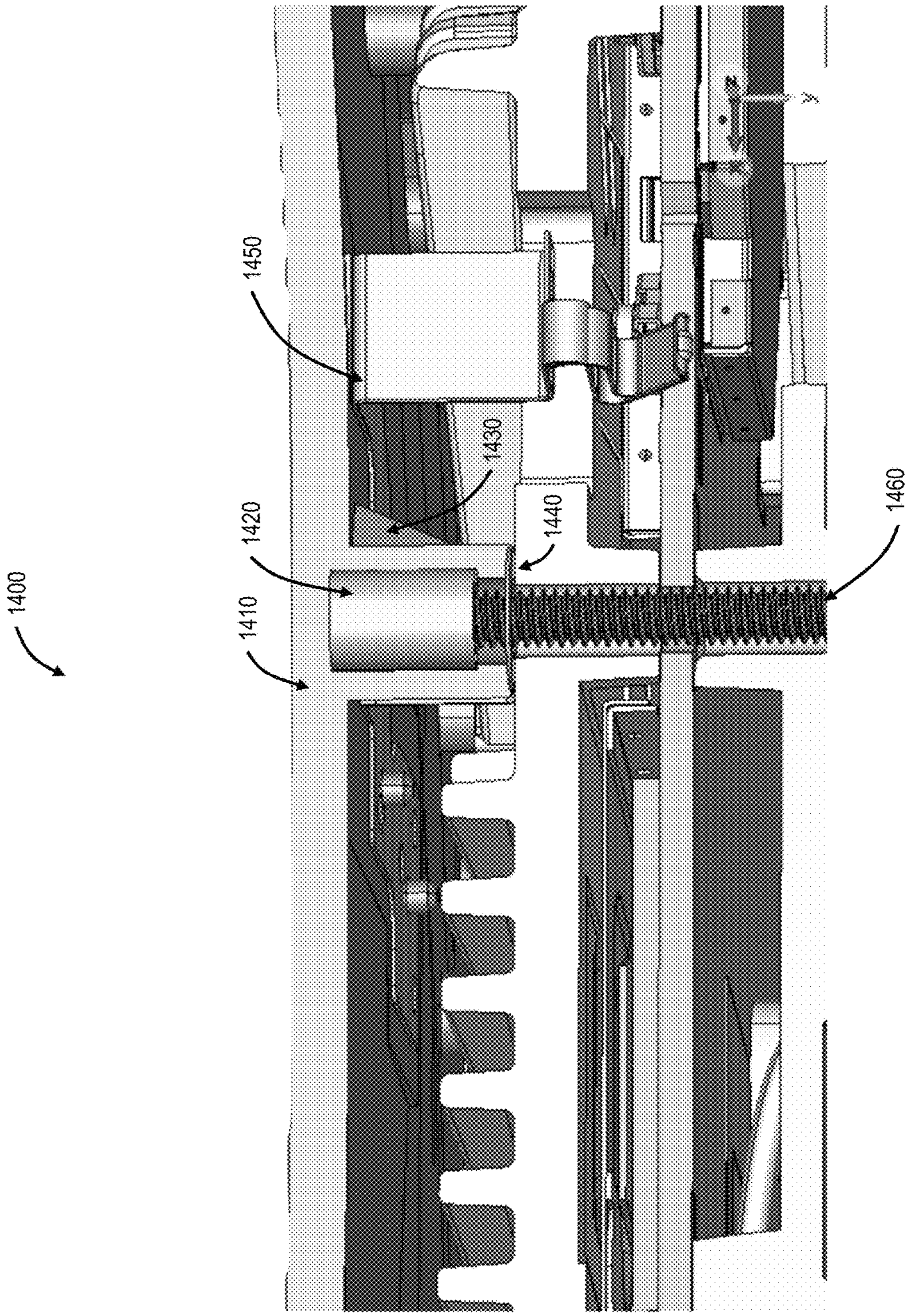
FIG. 14 is a section view of the wireless device with dielectric insulator extended to act as an antenna carrier.

FIG. 14 is a section view of the wireless device with dielectric insulator 1410 extended to cover the antenna. The dielectric insulator 1410 fills the gap between the screw boss 1420 and the antenna short 1430/antenna short foot 1440. In this view the dielectric insulator is extended above the antenna 1450 and can become part of the additional dielectric materials that are part of the wireless device. Extending the dielectric material across the top of the wireless device including the antenna 1450, but also including other wireless components, the dielectric material can serve as the wireless device lid/cover. Extending this dielectric as one continuous piece further decreases the number of screws that are involved in the assembly by eliminating screws that would normally be required for the enclosure lid. This would allow the antenna components, the screw boss 1420, and the lid of the wireless device to be one component installed in one step during assembly and screwed in place by the single screw 1460. The dielectric that exists between the screw boss 1420 and the antenna short 1430 is the key component to have the capability of combining components and eliminating screws and acts as the mechanical carrier for the assembly. The dielectric insulator 1410 can act as a lid to the wireless device or can be separate from the lid. The flexibility of being able to design this antenna structure in different locations inside the wireless device as well as combining multiple components into one assembly step is a key factor in implementing a PIFA/IFA antenna with multiple resonances inside a small form wireless or smart device.

Figure 15:
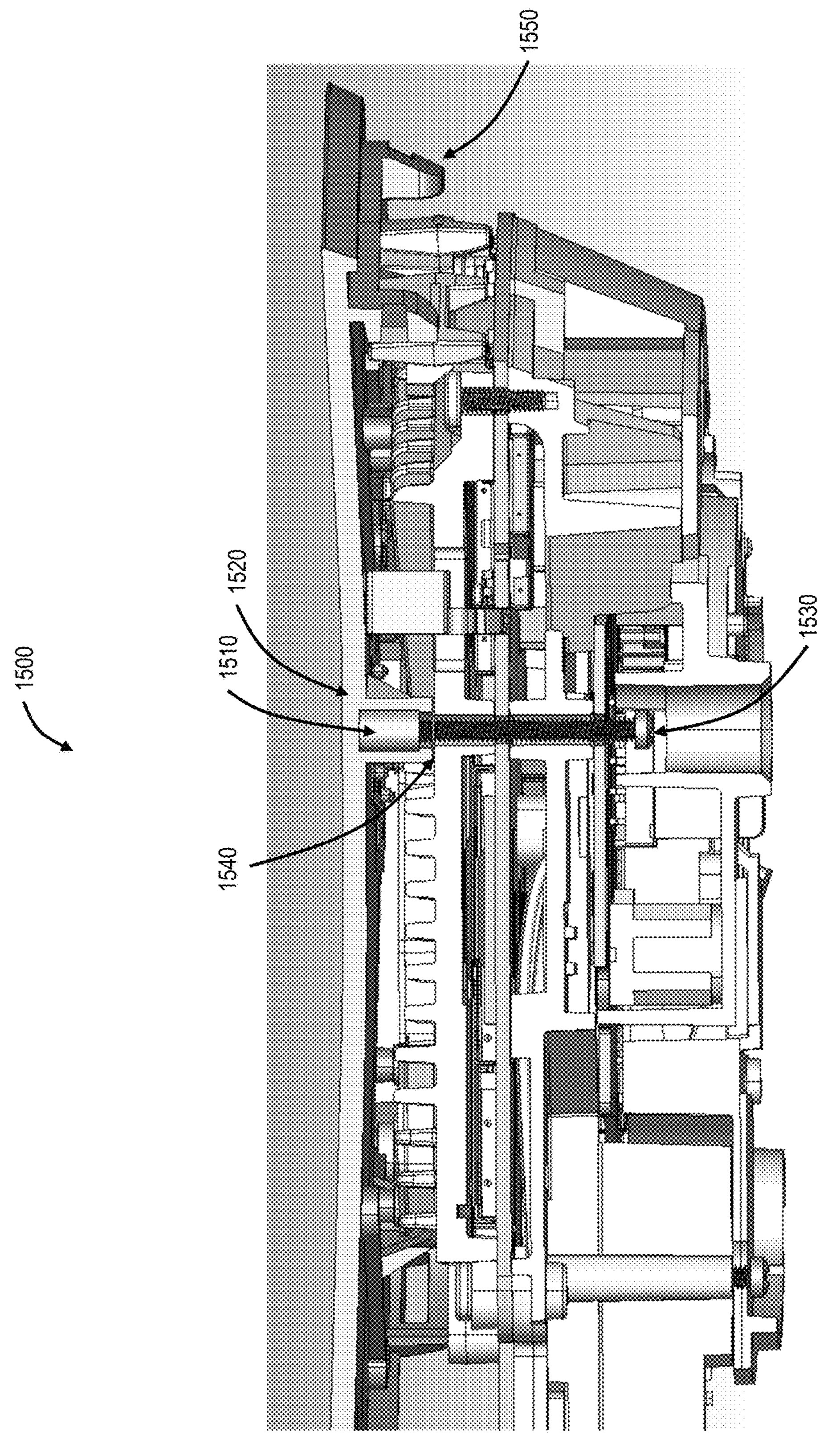
FIG. 15 is a sectional view of the wireless device with the dielectric insulator acting as the wireless device lid.

FIG. 15 is a sectional view of the wireless device with the dielectric insulator acting as the wireless device lid. The sectional view shows the internal components without the wireless device enclosure base installed. As shown the dielectric insulator 1520 fills the gap between the screw boss 1510 and the antenna short foot 1540. In addition, the dielectric insulator serves as the lid to the wireless device. The dielectric insulator consists of a single component including the screw boss 1510 and gets mechanically supported by the ground screw 1530. The ground screw supporting means may be supplemented by the snap hook clip 1550 shown on the outside of the wireless device lid to further serve as a fastening method. This single combined insulator piece can also be a mechanical carrier for the antenna to further simplify and accelerate the assembly process.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. An antenna for an electronic device, the antenna comprising:

a metal-sheet antenna;

an antenna feed connecting the metal-sheet antenna to a radio frequency (RF) printed circuit board (PCB);

a screw configured to i) operate as a ground feed for the metal-sheet antenna, ii) to provide mechanical support in the electronic device, and iii) provide radiation for additional bands for the antenna.

2. The antenna of claim 1, wherein the metal-sheet antenna supports a first band and the screw supports a second band and a third band.

3. The antenna of claim 1, wherein the metal-sheet antenna supports a first band and the screw supports a second band, based on dimensions of a screw boss, and a third band, based on a gap between the screw boss and the metal-sheet antenna.

4. The antenna of claim 3, wherein the first band is about 2.4 GHz, the second band is about 6.5 GHZ, and the third band is about 8 GHz.

5. The antenna of claim 3, wherein the first band is for any of Wi-Fi, Bluetooth, and Matter, and the second and third bands are each for Ultra-Wideband (UWB).

6. The antenna of claim 1, wherein the screw extends through one or more heat spreaders and the RF PCB.

7. The antenna of claim 1, further comprising:
an insulator between a screw boss on the screw and the metal-sheet antenna.

8. The antenna of claim 7, wherein the insulator is also on the metal-sheet antenna.

9. The antenna of claim 1, further comprising:
a screw boss connected to the screw, wherein the screw boss is extended for tuning of the metal-sheet antenna.

10. The antenna of claim 1, wherein the metal-sheet antenna is attached to a heat spreader associated with the electronic device.

11. The antenna of claim 1, wherein the screw is electrically floating relative to the metal-sheet antenna.

12. An electronic device comprising:
a radio frequency (RF) printed circuit board (PCB);
a heat spreader adjacent to the RF PCB;
a metal-sheet antenna adjacent to the heat spreader;
an antenna feed connecting the metal-sheet antenna to the RF PCB through the heat spreader;
a screw configured to i) operate as a ground feed for the metal-sheet antenna, ii) to provide mechanical support in the electronic device, and iii) provide radiation for additional bands for the electronic device.

13. The electronic device of claim 12, wherein the electronic device is a wireless access point.

14. The electronic device of claim 12, further comprising:
an insulator between a screw boss on the screw and the metal-sheet antenna.

15. The electronic device of claim 14, wherein the metal-sheet antenna, the screw boss, and the insulator are a one-piece assembly mechanically supported by the screw.

16. The electronic device of claim 14, wherein the insulator is extended to include the electronic device lid or other dielectric means.

17. A method of forming an antenna for an electronic device, the antenna comprising:
providing a metal-sheet antenna;
connecting an antenna feed to the metal-sheet antenna and to a radio frequency (RF) printed circuit board (PCB);
providing a screw configured to i) operate as a ground feed for the metal-sheet antenna, ii) to provide mechanical support in the electronic device, and iii) provide radiation for additional method for the antenna.

18. The method of claim 17, wherein the screw extends through one or more heat spreaders and the RF PCB.

* * * * *